US 8,638,986 B2

(12) United States Patent
Jiang et al.

(10) Patent No.: US 8,638,986 B2
(45) Date of Patent: Jan. 28, 2014

(54) ONLINE REFERENCE PATCH GENERATION AND POSE ESTIMATION FOR AUGMENTED REALITY

(75) Inventors: Bolan Jiang, San Diego, CA (US); Charles Wheeler Sweet, III, San Diego, CA (US); Prasun Choudhury, San Diego, CA (US); Dheeraj Ahuja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 13/191,340

(22) Filed: Jul. 26, 2011

(65) Prior Publication Data

US 2012/0269388 A1    Oct. 25, 2012

Related U.S. Application Data

(60) Provisional application No. 61/477,524, filed on Apr. 20, 2011.

(51) Int. Cl.
*G06K 9/00* (2006.01)

(52) U.S. Cl.
USPC ............................ 382/103; 348/135; 600/407

(58) Field of Classification Search
None
See application file for complete search history.

(56) References Cited

U.S. PATENT DOCUMENTS

| 5,967,979 A * | 10/1999 | Taylor et al. ................. 600/407 |
| 7,333,676 B2 | 2/2008 | Myers et al. |
| 2006/0078214 A1 | 4/2006 | Gallagher |
| 2008/0111814 A1 | 5/2008 | Sengamedu |
| 2009/0110241 A1 | 4/2009 | Takemoto et al. |
| 2009/0226094 A1 | 9/2009 | Yamazaki |
| 2010/0208057 A1* | 8/2010 | Meier et al. ................... 348/135 |
| 2011/0055049 A1 | 3/2011 | Harper et al. |
| 2011/0129118 A1 | 6/2011 | Hagbi et al. |

FOREIGN PATENT DOCUMENTS

| EP | 1498847 A2 | 1/2005 |
| JP | 2011134343 A | 7/2011 |

OTHER PUBLICATIONS

International Search Report and Written Opinion—PCT/US2012/033100—ISA/EPO—Sep. 26, 2012.
Hagbi, et al., "Shape Recognition and Pose Estimation for Mobile Augmented Reality," IEEE Transactions on Visualization and Computer Graphics, vol. 17, No. 10, Oct. 2011, pp. 1369-1379.
Babaee-Kashany et al. "Camera pose estimation in soccer scenes based on vanishing points", 2010 IEEE International Symposium on Haptic Audio-Visual Environments and Games (HAVE), pp. 1-6, Oct. 2010.

(Continued)

*Primary Examiner* — Tsung-Yin Tsai
(74) *Attorney, Agent, or Firm* — Silicon Valley Patent Group LLP

(57) ABSTRACT

A reference patch of an unknown environment is generated on the fly for positioning and tracking. The reference patch is generated using a captured image of a planar object with two perpendicular sets of parallel lines. The planar object is detected in the image and axes of the world coordinate system are defined using the vanishing points for the two sets of parallel lines. The camera rotation is recovered based on the defined axes, and the reference patch of at least a portion of the image of the planar object is generated using the recovered camera rotation. The reference patch can then be used for vision based detection and tracking. The planar object may be detected in the image as sets of parallel lines or as a rectangle.

24 Claims, 8 Drawing Sheets

(56) References Cited

OTHER PUBLICATIONS

George Klein and David Murray, "Parallel Tracking and Mapping on a Camera Phone", 8th IEEE International Symposium on Mixed and Augmented Reality (ISMAR), pp. 83-86, Oct. 19-22, 2009.

W. Lee, Y. Park, V. Lepeti, W. Woo, "Point-and-Shoot for Ubiquitous Tagging on Mobile Phones", 2010 9th IEEE International Symposium on Mixed and Augmented Reality (ISMAR), pp. 57-64, Oct. 13-16, 2010.

Rober M. Haralick, et al., "Pose Estimation for Corresponding Point Data", IEEE Transactions on Systems, Man and Cybernetics, vol. 19, No. 6, pp. 1426-1446, 1989.

Yagi et al., "Dynamic Scene Analysis for a Mobile Robot in a Man-Made Environment", Journal of Institute of Electronics and Communication Engineers of Japan, '86/6 vol. J69-D No. 6: 967-974, 1985.

ARTookKit Home Page; http://www.hitl.washington.edu/artoolkit/, downloaded Jul. 14, 2011.

Chia-Hoang Lee., "Structure and Motion From Two Perspective Views Via Planar Patch". 19881205; 19881205-19881208. Dec. 5, 1988, pp. 158-164, XP010225200.

Dieter Koller ., et al., "Real-time vision-based camera tracking for augmented reality applications", VAST '97, Jan. 1, 1997, pp. 87-94, XP055080580, New York, USA DOI: 10.1145/261135.261152,1SBN: 978-0-89-791953-1.

Klinker G ., et al., "Augmented Reality: A Balancing Act Between High Quality and Real-Time Constraints", Mixed Reality. Merging Real and Virtual Worlds. Proceedings Ofinternational Symposium on Mix Reality. Merging Real and Virtual Worlds, Jan. 1, 1993. pp. 325-346, XP001117806.

Lepetit V., et al., "Monocular Model-Based 3D Tracking of R1gid Objects: A Survey," Foundations and Trends in Computer Graphics and Vision, Now Publishers Inc. US. vol. 1. No. 1, Jan. 1, 2005. pp. 1-89, XP007903009. ISSN: 1572-2740.

Martin Hirzer: "Marker Detection for Augmented Reality Applications", Technical Report, ICG TR 08/05, Oct. 27, 2008, pp. 1-27, XP055080592, URL:http://Irs.icg.tugraz.aVpubs/hirzer_tr_2008.pdf.

Polanski A., et al., "Stereo calibration by planar grid lines". Sep. 6, 1995, Conference Info: Computer Analysis of Images and Patterns. Springer Berlin Heidelberg, Berlin. Heidelberg, pp. 456-463, XP019181022. ISBN: 978-3-540-60268-2.

Rong Zhang., "Camera Calibration",ECE 661 Computer Vision Homework 8, Nov. 20, 2008, pp. 1-43, XP055080419, https://engineerIng.purdue.edu/kak/courses-1-teach/ECE661. 08/solution/11w8s1.pdf.

* cited by examiner

ONLINE REFERENCE PATCH GENERATION AND POSE ESTIMATION FOR AUGMENTED REALITY

CROSS-REFERENCE TO PENDING PROVISIONAL APPLICATION

This application claims priority under 35 USC 119 to U.S. Provisional Application No. 61/477,524, filed Apr. 20, 2011 and entitled "Online Reference Map Generation and Pose Estimation for Augmented Reality" which is assigned to the assignee hereof and which is incorporated herein by reference.

BACKGROUND

An augmented reality system can insert virtual objects in a user's view of the real world. One key requirement of a successful augmented reality system is a tracking system which can estimate the user's pose accurately relative to a reference, such as a 3D model, etc. This allows the virtual augmentation to be tightly registered to the real-world environment.

Tracking systems for augmented reality need to acquire a reference, which may be a 3D model of the environment, artificial markers placed in the environment or the front view image of a planar surface in the environment. However, it is not always convenient or possible to obtain the reference before performing augmented reality. The dependency on the prior knowledge of the environment greatly limits the usage of augmented reality technology. Thus, it is desirable to generate a reference of an environment on the fly.

An example of a known tracking technology is described by George Klein and David Murray, "Parallel Tracking and Mapping on a Camera Phone", 8th IEEE International Symposium on Mixed and Augmented Reality (ISMAR), pp. 83-86, 19-22 Oct. 2009 ("PTAM"), which does not need prior knowledge of the environment. The PTAM method initializes a reference patch by detecting a planar surface in the environment. This method requires that the surface is detected in two images, and the homography between the two images is computed and is used to estimate 3D location for the points detected on the surface. Thus, the PTAM method requires two images to generate the reference patch while the present invention requires only one. Another example of tracking technology, sometimes referred to as a point-and-shoot method, is described in W. Lee, Y. Park, V. Lepeti, W. Woo, "Point-and-Shoot for Ubiquitous Tagging on Mobile Phones", 2010 9th IEEE International Symposium on Mixed and Augmented Reality (ISMAR), pp. 57-64, 13-16 Oct. 2010, in which the camera orientation is estimated by accelerometers. An image is warped to the frontal view and a set of "mean patches" are generated. Each mean patch is computed as the average of the patches over a limited range of viewpoints, and the ranges over all the mean patches cover all possible views. The point-and-shoot method, thus, relies on sensors to generate reference patch. Moreover, the point-and-shoot method requires the planar object on a vertical or horizontal position. Another method, such as that used by ARTookKit tracks pre-generated high-contrast squares that are printed on the surface of the environment to be tracked. Thus, improvements are desirable.

SUMMARY

A reference patch of an unknown environment is generated on the fly for positioning and tracking. The reference patch is generated using a captured image of a planar object with two perpendicular sets of parallel lines. The planar object is detected in the image and axes of the world coordinate system are defined using the vanishing points for the two sets of parallel lines. The camera rotation is recovered based on the defined axes, and the reference patch of at least a portion of the image of the planar object is generated using the recovered camera rotation. The reference patch can then be used for vision based detection and tracking. The planar object may be detected in the image as sets of parallel lines or as a rectangle.

In one aspect, a method includes capturing one image of a planar object with a mobile platform, the planar object comprising a first set of parallel lines that are perpendicular to a second set of parallel lines, detecting the planar object in the one image, defining a first axis for a world coordinate system using a first vanishing point for the first set of parallel lines and defining a second axis for the world coordinate system using a second vanishing point for the second set of parallel lines, recovering a camera rotation using the first axis and the second axis, generating a reference patch of at least a portion of the one image of the planar object using the camera rotation that is recovered, and comparing the reference patch to additional captured images of the planar object to estimate a pose of the mobile platform with respect to the planar object.

In another aspect, an apparatus includes a camera for capturing an image of a planar object, the planar object comprising a first set of parallel lines that are perpendicular to a second set of parallel lines. The apparatus further includes a processor coupled to the camera for receiving the image of the planar object, the processor is adapted to detect the planar object in the image, define a first axis for a world coordinate system using a first vanishing point for the first set of parallel lines and defining a second axis for the world coordinate system using a second vanishing point for the second set of parallel lines, recover a camera rotation using the first axis and the second axis, generate a reference patch of at least a portion of the one image of the planar object using the camera rotation that is recovered, and compare the reference patch to additional captured images of the planar object to estimate a pose with respect to the planar object.

In another aspect, an apparatus includes means for capturing one image of a planar object, the planar object comprising a first set of parallel lines that are perpendicular to a second set of parallel lines; means for detecting the planar object in the one image; means for defining a first axis for a world coordinate system using a first vanishing point for the first set of parallel lines and defining a second axis for the world coordinate system using a second vanishing point for the second set of parallel lines; means for recovering a camera rotation using the first axis and the second axis; means for generating a reference patch of at least a portion of the one image of the planar object using the camera rotation that is recovered; and means for comparing the reference patch to additional captured images of the planar object to estimate a pose with respect to the planar object.

In yet another aspect, a non-transitory computer-readable medium including program code stored thereon, includes program code to detect a planar object in an image, the planar object having a first set of parallel lines that are perpendicular to a second set of parallel lines; program code to define a first axis for a world coordinate system using a first vanishing point for the first set of parallel lines and defining a second axis for the world coordinate system using a second vanishing point for the second set of parallel lines; program code to recover a camera rotation using the first axis and the second axis; program code to generate a reference patch of at least a portion of the image of the planar object using the camera rotation that is recovered, and program code to compare the reference patch to additional captured images of the planar object to estimate a pose with respect to the planar object.

DETAILED DESCRIPTION

Figure 1:
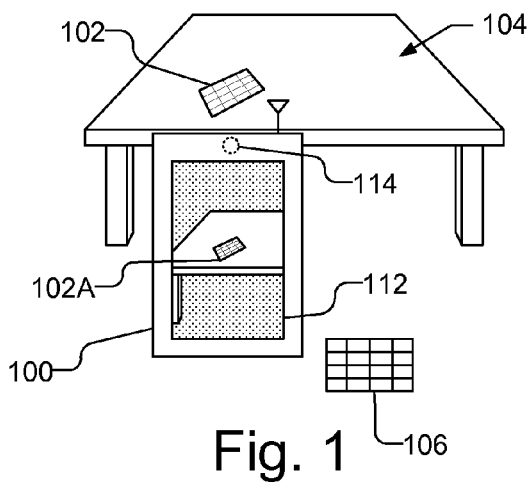
FIG. 1 illustrates a mobile platform that can generate a reference patch of an unknown environment, which may be used for positioning and tracking.

FIG. 1 illustrates a mobile platform 100 that can generate a reference patch of an unknown environment on the fly, which may be used for positioning and tracking, e.g., in augmented reality (AR) type applications. The mobile platform 100 performs an initialization process by capturing an image with a camera 114 of a rectangular planar object 102 within the environment 104. The image 102A of the object 102 is illustrated as being displayed in the display 112 of the mobile platform 100. From the captured image, the object 102 is recognized and a reference patch 106 is generated, from which the orientation and position (pose) of the mobile platform 100 can be determined. If desired, the reference patch 106 may be transmitted to other mobile platforms (not shown) so that a number of mobile platforms viewing the object 102 all have the same reference image, which may be useful when the pose of multiple mobile platforms with respect to each other, as well as the object 102, is desired, e.g., in AR gaming type applications.

It should be understood that the mobile platform may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of capturing images and positioning and tracking.

Figure 2:
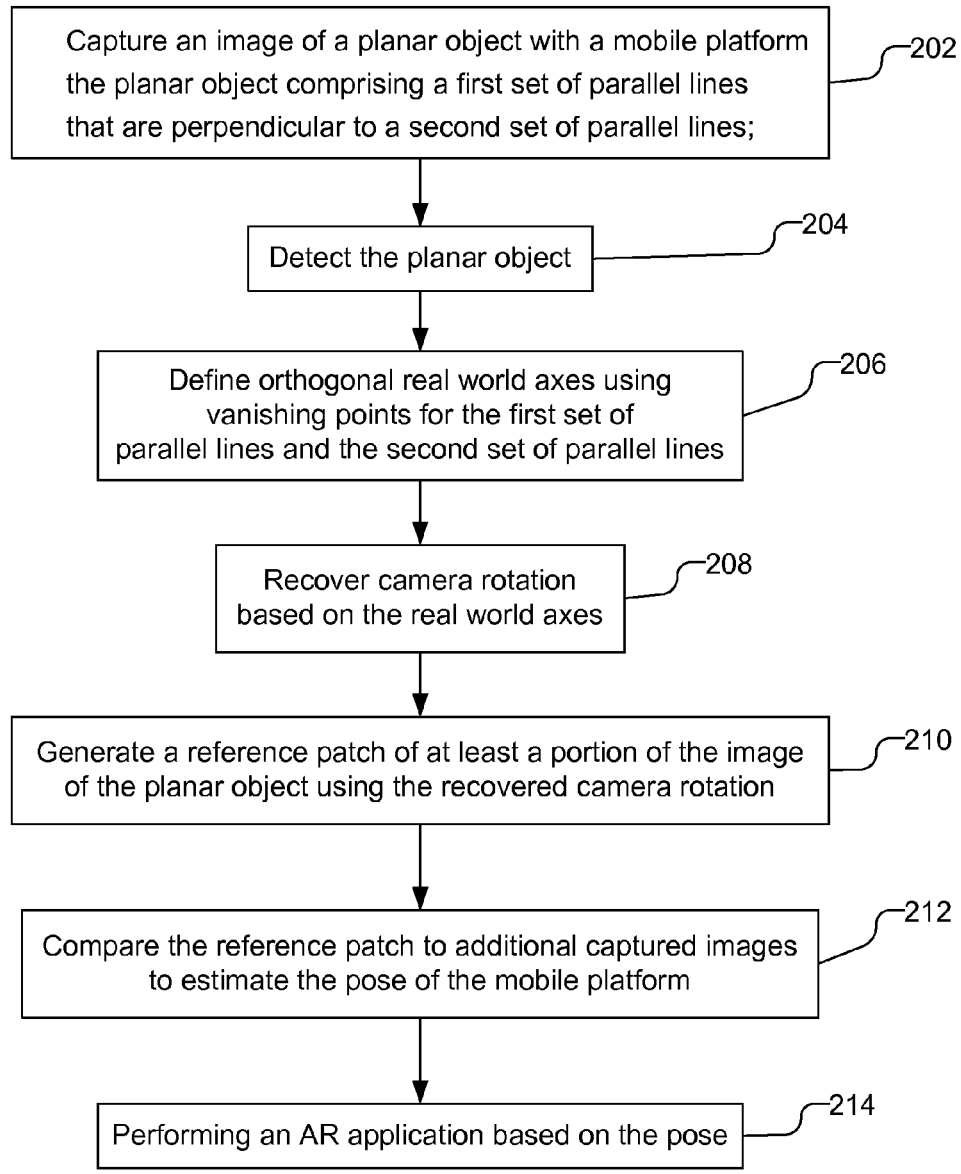
FIG. 2 is a flow chart describing the process of generating a reference patch of an unknown environment.

FIG. 2 is a flow chart describing the process of generating a reference patch of an unknown environment. The mobile platform 100 captures an image with the camera 114 (202). It should be understood that as used herein, a captured image may be a single image, e.g., photo, or a frame of video captured by the camera 114. The captured image is of a planar object that includes a first set of parallel lines that is perpendicular to a second set of parallel lines. For example, the planar object may be a piece of paper, credit card or other rectangular object, e.g., lying on a surface such as a desk, as illustrated in FIG. 1. The planar object may alternatively be a building or other structure with multiple sets of parallel lines, where at least two sets of parallel lines are perpendicular and co-planar.

Figure 3:
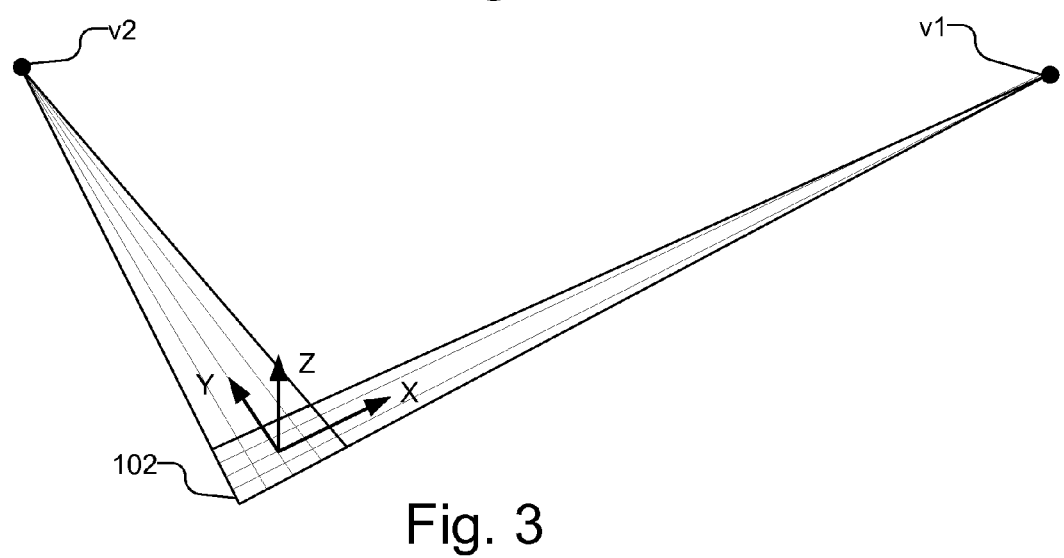
FIG. 3 illustrates vanishing points of a planar rectangular object, which are used to define axes for the real world coordinate system.

The planar object is detected in the captured image 204. Orthogonal real world axes are defined using vanishing points for the first set of parallel lines and the second set of parallel lines (206). For example, as illustrated in FIG. 3, a first vanishing point v1 of the planar object 102 may be defined as corresponding to the x-axis X for the real world coordinate system and a second vanishing point v2 may be defined as corresponding to the y-axis Y. Of course, the vanishing points v1 and v2 may be defined as corresponding to any orthogonal axes using appropriate transformations. As the planar object 102 includes perpendicular sets of parallel lines, the x-axis X and y-axis Y defined using vanishing points v1 and v2 will be orthogonal. The normal direction, i.e., z-axis Z, with respect to the planar object 102 can be defined as the cross product of X and Y, i.e., $Z=v1 \times v2$. The orientation of the planar object is thus given by a 3×3 matrix R[X|Y|Z].

Figure 4:
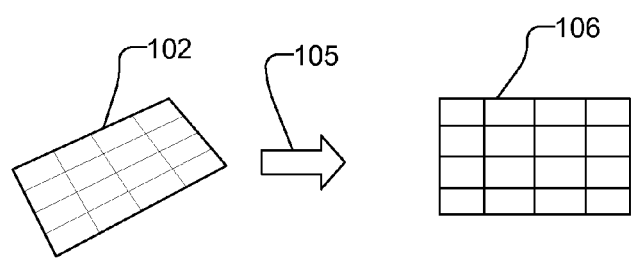
FIG. 4 illustrates the image of a planar object warped to a frontal view to produce a reference patch.

The camera rotation is then recovered based on the defined orientation of the planar object (208). A reference patch of at least a portion of the image of the planar object is then generated using the recovered rotation of the camera (210). For example, the image of the planar object 102 may be warped to the front view, i.e., the view in which surface normal to the planar object is parallel with the viewing direction of the camera, as illustrated by transformation 105 in FIG. 4. If desired, however, less than the entire image of the planar object maybe warped to form the reference patch 106. For example, point features or keypoint features extracted from the area bounded by the two sets of parallel lines, e.g., inside the rectangle, may be warped to the front view. Alternatively, line features or portions thereof bounded by the two sets of parallel lines, e.g., inside the rectangle, including the parallel lines themselves, may be warped to the front view. For example, the line features may be a plurality of points on the first set of parallel lines and on the second set of parallel lines including points of intersection between the sets of parallel lines. If desired, point features on the plane of the planar object, but that are not bounded by the two sets of parallel lines, may be warped to form the reference patch 106.

Figure 5:
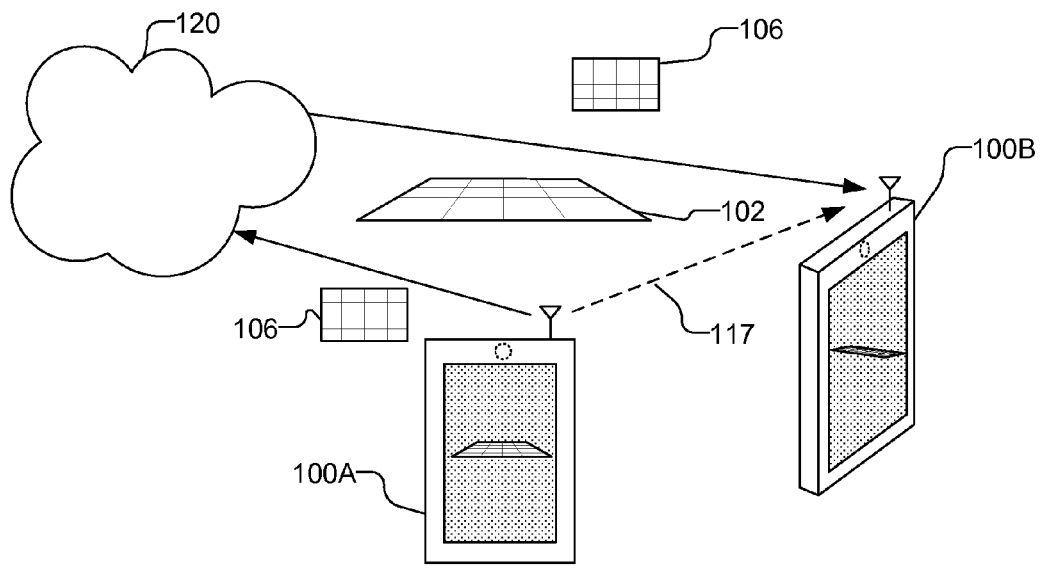
FIG. 5 illustrates a first mobile platform transmitting a reference patch to a second mobile platform.

If there is more than one user, the frontal view reference patch 106 may be sent to other users. FIG. 5, by way of example, illustrates a first mobile platform 100A that captures an image of the object 102 and produces the reference patch 106 as described above. The mobile platform 100A may then transmit the reference patch 106 to a second mobile platform 100B either directly, as indicated by dotted arrow 117 or via a wireless network 120. If the reference patch is a standard image, existing network protocols and image standards may be used to compress, send and decompress the reference patch.

The reference patch is used to estimate the pose of the mobile platform, with respect to the planar object 102 by comparing the reference patch to additional captured images of the planar object 102 (212) and, if desired, an AR application may be performed based on the determined pose (214). Comparison of the reference patch to additional captured images may use the points or line features from the reference patch, e.g., features extracted using known feature extraction techniques, such as such as Scale Invariant Feature Transform (SIFT), which localizes features and generates their descriptions. If desired, other techniques, such as Speed Up Robust Features (SURF), Gradient Location-Orientation Histogram (GLOH), Compressed Histogram of Gradients (CHoG) or other comparable techniques may be used. For any detected 2D point (x, y), its 3D coordinate is (sx, sy, 0), where s is a non-zero arbitrary constant. If there are multiple users, s should have the same value for all users, which may be a defined value. The 2D projections of the 3D points are searched on each new captured image, e.g., incoming video frame, and the pose is estimated using the matched 3D-2D point pairs.

If desired, line features may also be used for pose estimation. First, the 2D lines are detected on the reference patch. For any detected 2D line, which is represented by its two end points (x1, y1) and (x2, y2); its corresponding 3D lines can be represented by two 3D points (sx1, sy1, 0) and (sx2, sy2, 0). Second, the 2D projections of the 3D lines are detected on each incoming video image. Finally, the pose is estimated using matched 3D-2D line pairs.

If the mobile platform 100 pans away from the object 102, i.e., so that the object 102 is no longer in the field of view of the camera 114, tracking of the pose of the mobile platform 100 with respect to the object 102 may continue to be performed using on-board motion sensors, such as accelerometers, gyroscopes, magnetometer, etc. When the mobile platform 100 is moved so that it again images the object 102, extracted features from within the image, e.g., extracted feature points or line features bounded by the sets of parallel lines, or the texture inside the rectangle, may be used to redetect and recognize the rectangle.

If the rectangular planar object 102 is not detected within a predetermined number of frames, e.g., 5 frames, the mobile platform 100 may use featured based tracking, where the pose is initialized based on the feature registration in subsequent frames.

Figure 6:
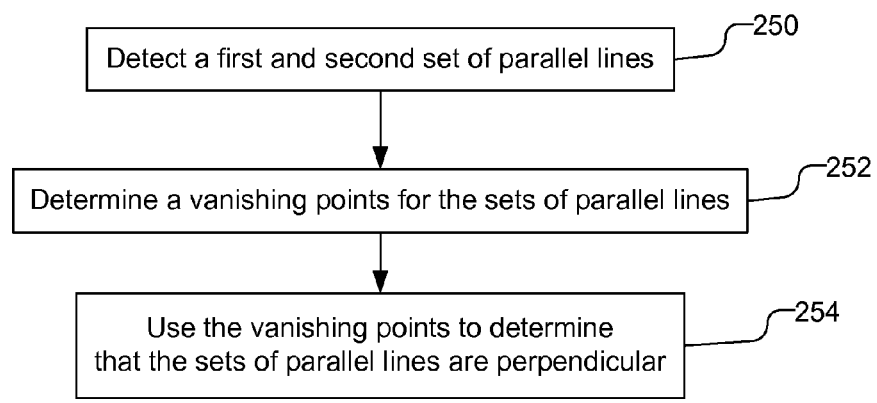
FIG. 6 is a flow chart illustrating the process of detecting a planar object in an image based on detecting perpendicular sets of parallel lines.

FIG. 6 is a flow chart illustrating the process of detecting the planar object in the image (step 204 in FIG. 2). The planar object is recognized by detecting sets of parallel lines within the image (250). The vanishing points for the sets of parallel lines are determined (252).

Figure 7:
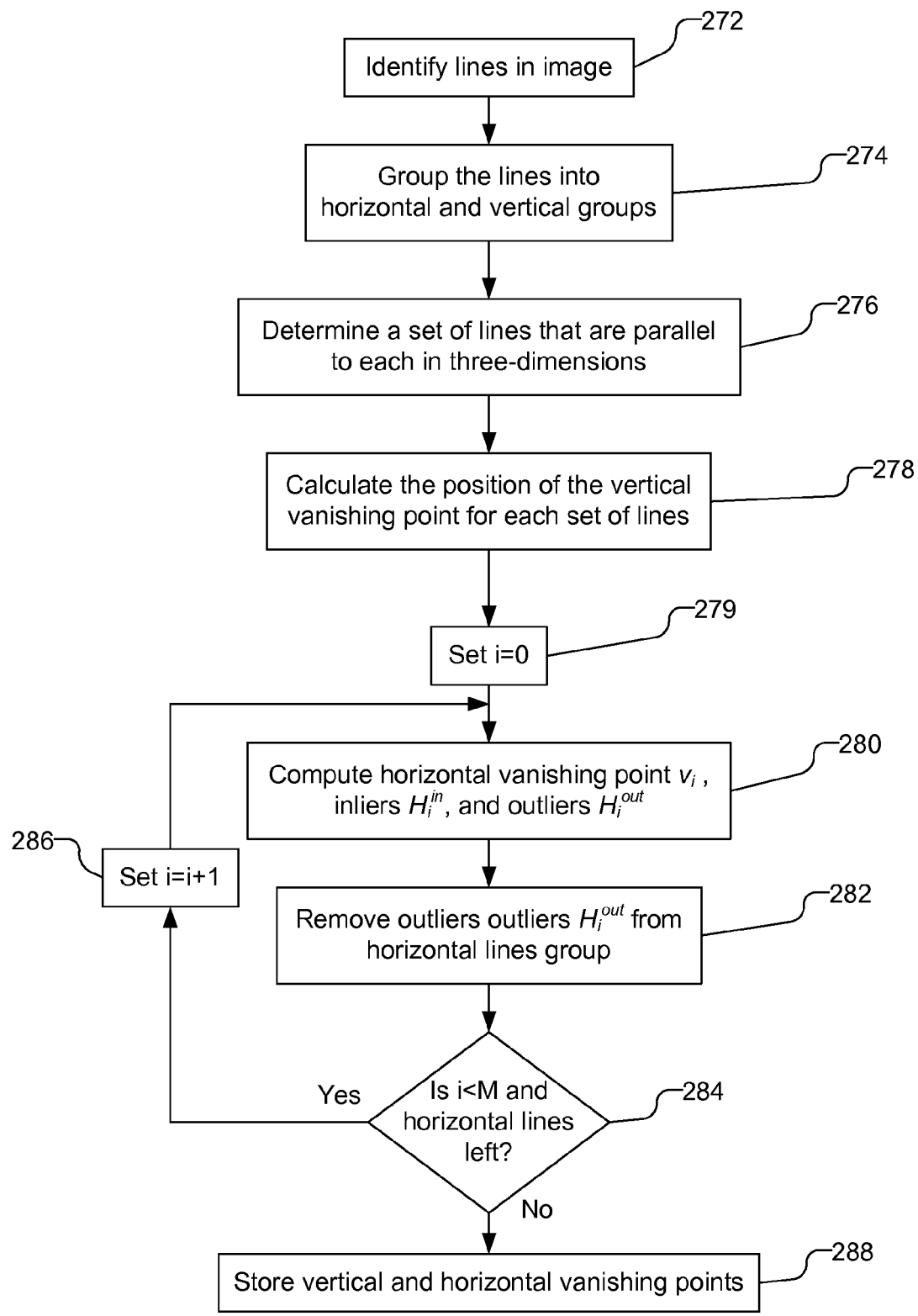
FIG. 7 is a flow chart illustrating the process of identifying parallel lines and vanishing points.

FIG. 7 is a flow chart illustrating the process of identifying parallel lines and vanishing points. As illustrated, lines in the image are identified (272), which may be performed using any desired edge or line detector operator, e.g., a convolution kernel, such as Canny, Sobel, or Robers Cross that detect edge pixels, which are then connected and fitted into line segments. Alternative method may be used as well such a line fitting algorithm such as a Hough transform. The lines are then grouped into horizontal and vertical groups (274). For example, if the angle between a line and the vertical axis on the image is smaller than a predetermined angle, such as 20 degrees, then the line is classified as a vertical line, and otherwise the line is classified as a horizontal line. Due to foreshortening, the image may include lines that are not parallel in the two-dimensional image, even if they are parallel in three-dimensions. Sets of vertical lines that are parallel to each other in three-dimensions are then determined (276). When extended, lines that are parallel and that lie on the sample planar surface in 3D space will pass through the same point on the 2D image, which is identified as the vanishing point for those lines. The vanishing point could be, but is not necessarily, a point at infinity in the 2D space. An intersection point for the extensions of two potentially parallel lines may be identified, and then it may be determined whether other lines pass through the same point when extended. Generally, when more than two lines, such as at least 5 lines, pass through the same point in the 2D space, those lines may be considered parallel in 3D space. The position of the vertical vanishing point for the three-dimensionally parallel lines is calculated (278).

Figure 8:
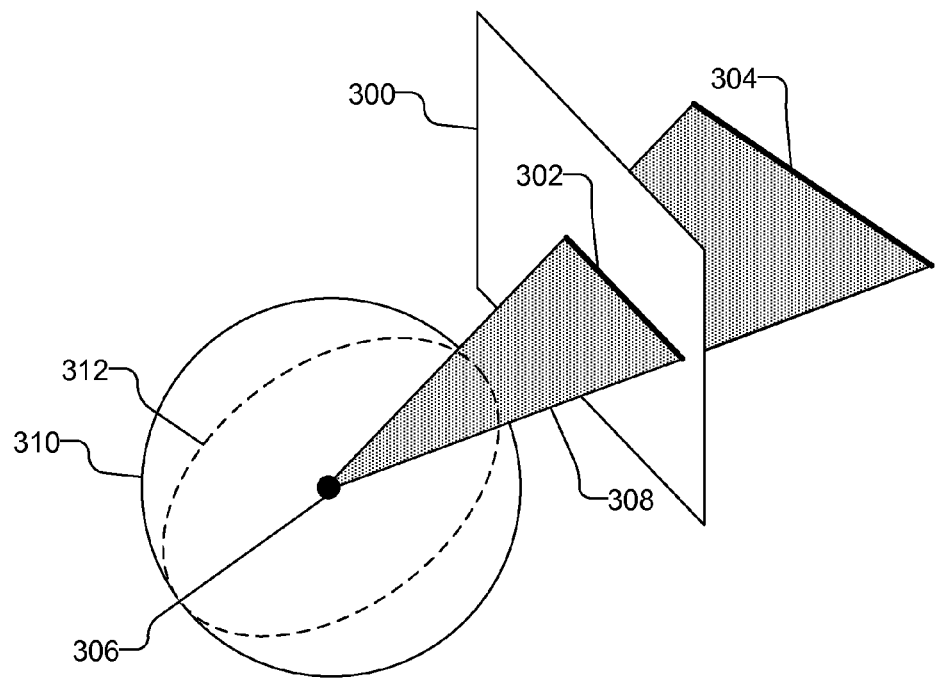
FIGS. 8 and 9 illustrate the determination of a vanishing point.
Figure 9:
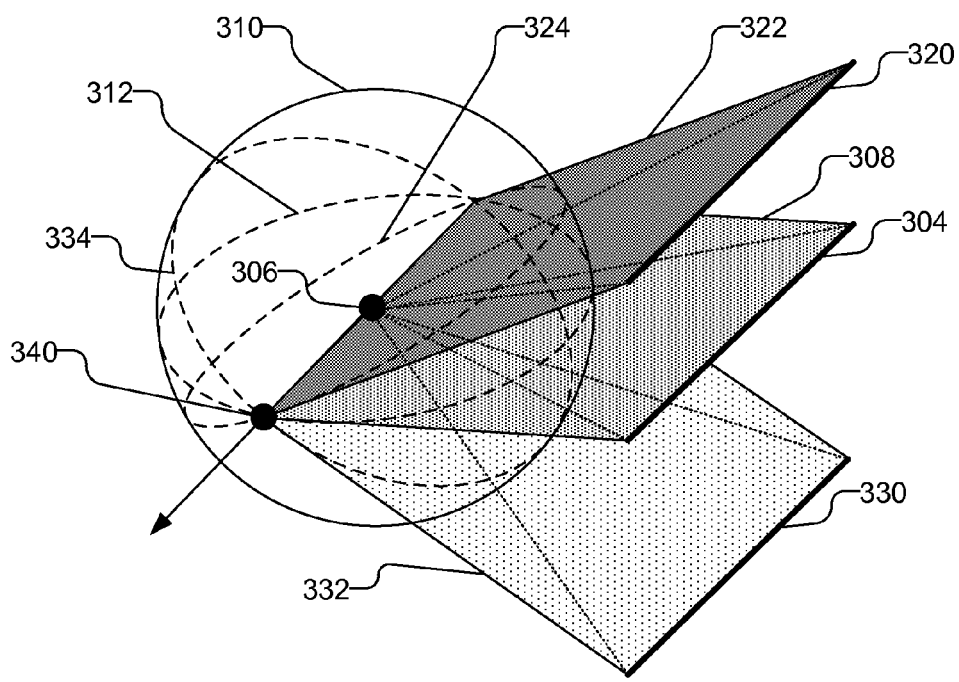

FIGS. 8 and 9 illustrate the definition of a vanishing point. FIG. 8 illustrates a plane 308 formed by the camera center position 306, a two dimensional line 302 in an image 300 and the corresponding line 304 in three-dimensional space. A Gaussian (unit) sphere 310 is illustrated centered on the camera center position 306, and the plane 308 intersects the Gaussian sphere 310 on a great circle 312. FIG. 9 illustrates the plane 308 formed by line 304 in three-dimensional space and the camera position 306 along with the Gaussian sphere 310 and the corresponding great circle 312. FIG. 9 also shows two additional lines 320 and 330 that are parallel to line 304 in three dimensional space, along with the planes 322 and 332 formed by the respective lines 320 and 330 and the camera position 306 and the corresponding great circles 324 and 334. The great circles 312, 324 and 334 intersect at a common vanishing point 340 on the Gaussian sphere 310, which can be used to identify the direction for the parallel lines 304, 320, and 330. Given a set of n lines that are parallel to each other in three-dimensional space, the vanishing point V is determined by solving the following equation:

$$l_i^T V_i = 0 \qquad \text{Eq. 1}$$

where $l_i = (a_i, b_i, c_i)$ represents the ith line. A method, such as RANSAC (RANdom SAmple Consensus) may be used to estimate the vertical vanishing point. It should be understood that the described vanishing point estimation method may be used when the image is produced by a roughly upright camera. If desired, other known vanishing point estimation methods may be used.

For vertical lines, there is only one vanishing point to determine, thus, equation 1, needs to be solved only once. For horizontal lines, however, multiple vanishing points are possible. To determine horizontal vanishing points, i is set to 0 (279) and the RANSAC method is used to compute the vanishing point $v_i$, the inliers $H_i^{in}$ and the outliers $H_i^{out}$ (280). The outliers $H_i^{out}$ are removed from the horizontal lines group (282). If i<M and there are more than six horizontal lines left (284), i is increased by one (286) and the process is repeated. If i is not less than M, or if there are no more than six horizontal lines left (284), the process ends and the vertical and horizontal vanishing points are stored 288 in memory. By way of example, the value M may be set at 5 or at any other desired value for the number of horizontal vanishing points to be used.

Figure 10:
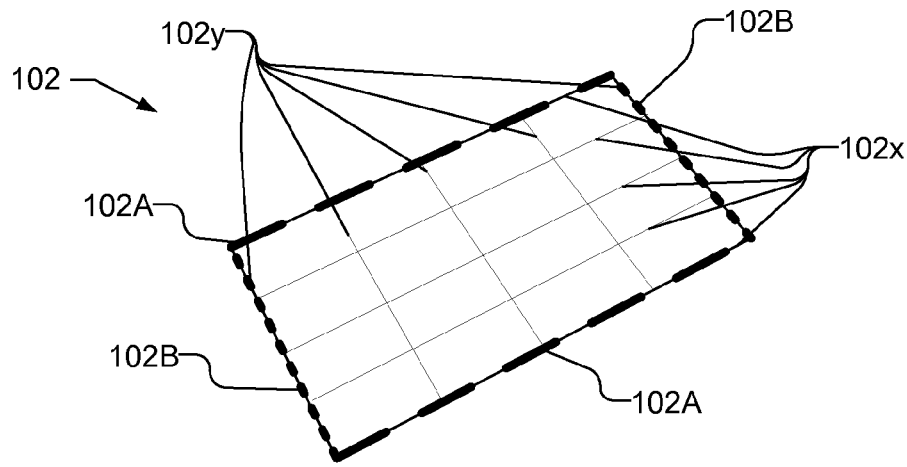
FIG. 10 illustrates a planar object identified based on perpendicular sets of parallel lines.

Referring back to FIG. 6, once the sets of parallel lines and their vanishing points are determined, the vanishing points are used to determine that the sets of parallel lines are perpendicular to each other (254). For example, FIG. 10 illustrates the object 102 with a first set of lines 102x and a second set of lines 102y, which can be identified as being parallel in 3D space as they pass through the same point in the 2D image space, as illustrated in FIG. 3. FIG. 3 illustrates the vanishing points v1 from the parallel lines 102x and vanishing point v2 from the parallel lines 102y. As discussed above, to identify parallel lines in 3D space, more than two lines in the image space of the object, e.g., 5 or more lines, should pass through the same point in the 2D image space. The point that the lines pass through is considered the vanishing point for the parallel lines. Two representative lines, e.g., illustrated by dashed lines 102A and dotted lines 102B, may be selected out of the set of, e.g., 5 or more, parallel lines. The representative lines may be selected based on factors such as continuity, length, or greatest distance between lines. The perpendicular relationship of sets of parallel lines is determined by $|v1*v2|=0$, where * represents dot product, v1 and v2 are represented in 3D homogeneous coordinates. Due to possible noise in the image, the absolute value of v1*v2 may be slightly larger than 0, and thus, a value less than a predetermined threshold, close to zero may be used to verify the perpendicular relationship.

Figure 11:
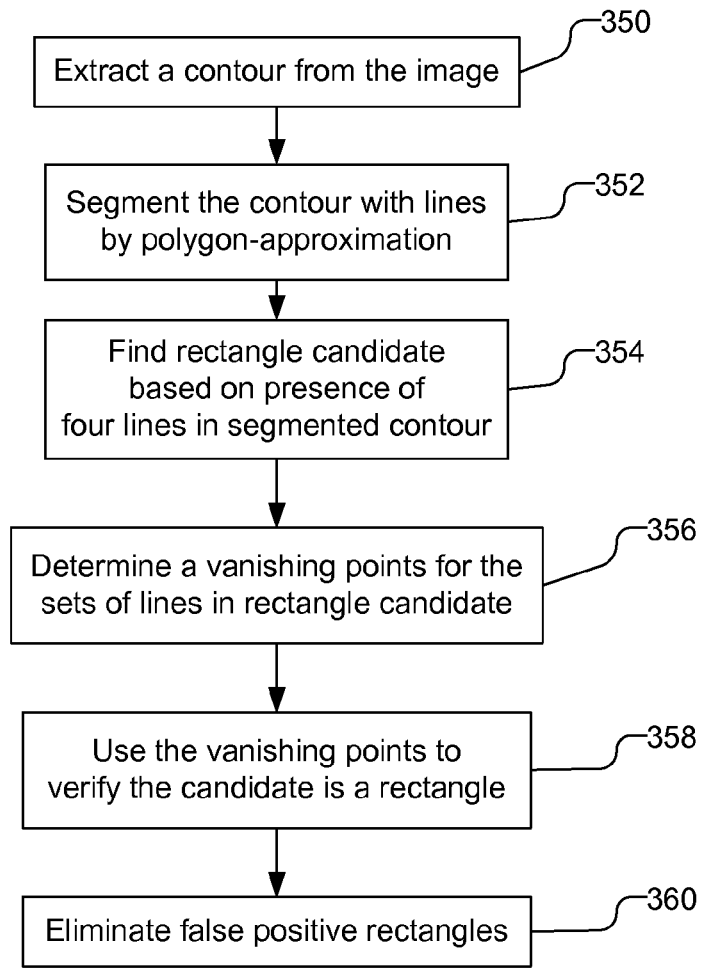
FIG. 11 is a flow chart illustrating the process of detecting the planar object by identifying a rectangle in the image.

In another example illustrated in the flow chart of FIG. 11, the process of detecting the planar object (step 204 in FIG. 2) may be performed by identifying a rectangle in the image. To detect a rectangle in the image, a contour is extracted from the captured image (350). Contour detection is well known in the art. For example, techniques, such as Square-Tracing algorithm, Moore-Neighbor Tracing, Radial Sweep algorithm, Theo Pavlidis' algorithm, or the method described by S. Suzkui and K. Abe in "Topological Structural Analysis of Digital Binary Images by Border Following", In Proc. Computer Vision, Graphics and Image, 30(1985): 32-46 may be used. A rectangle candidate may then be identified within a contour. For example, the extracted contours may be segmented with lines by polygon-approximation, such as the Douglas-Peucker algorithm (352). If a segmented contour has four lines, it is considered a rectangle candidate (354). Other techniques of rectangle detection may be used if desired. For example, rectangles may be identified by first detecting straight lines in the captured images, followed by fitting the detected lines into rectangles.

Figure 12:
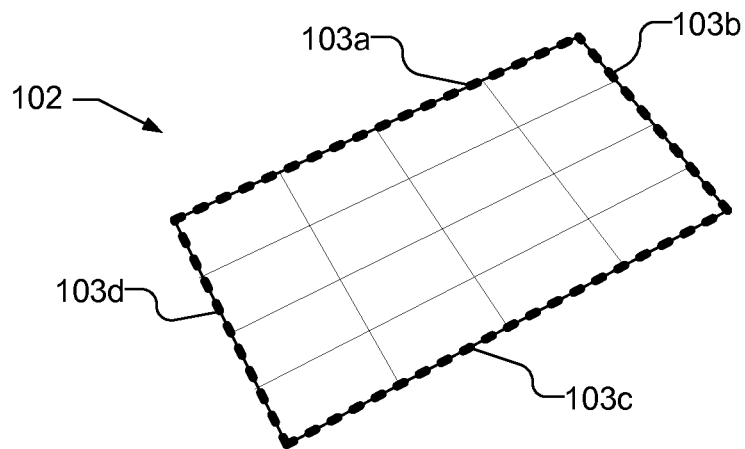
FIG. 12 illustrates the planar object identified as a rectangle.

The vanishing points for the sets of lines in the rectangle candidate are determined (356) and the vanishing points are used to verify the candidate as a rectangle (358). When a rectangle candidate is used, the vanishing points may be identified using only two lines, whereas when vanishing points are found without a rectangle candidate, i.e., as discussed in FIG. 7 above, more than two lines are used. FIG. 12, by way of example, illustrates the object 102, which is identified as a rectangle candidate, as illustrated in FIG. 12 by the dotted perimeter of the object 102. The rectangle candidate 102 is verified as a rectangle, using the vanishing points for opposite lines on the rectangle candidate, e.g., using line pairs 103*a* and 103*c* and line pairs 103*b* and 103*d*. The vanishing points for the line pairs of the rectangle candidate may be calculated, e.g., by representing the lines 103*a* and 103*c* as 3D vectors la and lc in the camera coordinate system, wherein vanishing point v1=la×lc; and similarly vanishing point v2=lb×ld, where la is the vector describing line 103*a*, la is the vector describing line 103*b*. The rectangle candidate is verified as a rectangle if the line pairs 103*a*, 103*c* and 103*b*, 103*d* are perpendicular to each other. The perpendicular relationship of the sets of parallel lines is verified by $|v1*v2|=0$, where * represents dot product, as discussed above. If there is more than one rectangle detected in the image, one rectangle may be selected, e.g., based on the largest area, user selection, etc.

Figure 13:
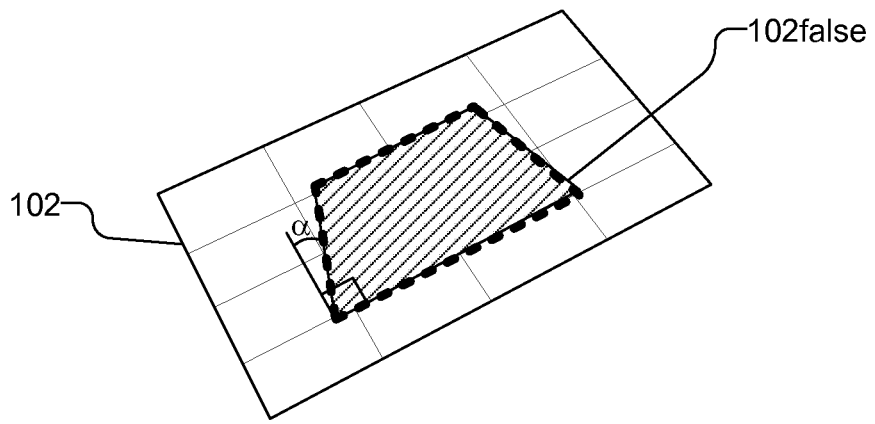
FIG. 13 illustrates a planar object that may produce a false positive rectangle.

Using the $|v1*v2|=0$ orthogonality condition for rectangle verification (step 358 in FIG. 11), however, may lead to false-positives, i.e., i.e., non-rectangular shapes may be classified as rectangles. For example, as illustrated in FIG. 13, a trapezoid 102false is illustrated as overlying object 102. The trapezoid 102false may produce a false positive rectangle. Thus, as illustrated in FIG. 11, false positive rectangles are eliminated 360.

Figure 14:
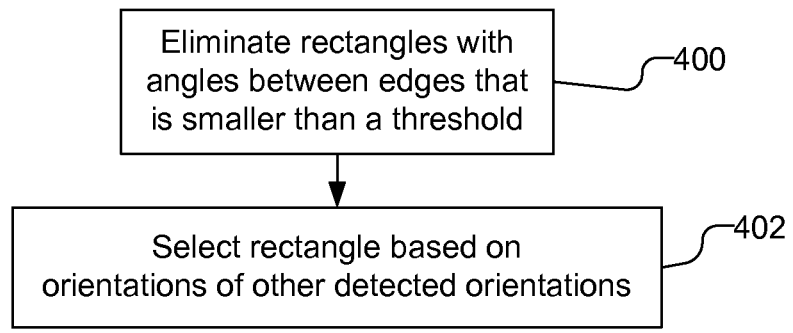
FIG. 14 is a flow chart illustrating the process of eliminating false-positive rectangles.

FIG. 14 illustrates a method of eliminating false-positive rectangles (step 360 in FIG. 11). As illustrated in FIG. 14, rectangles with angles formed between the neighboring sides in the image plane that exceed a threshold are eliminated (400). In general, when a rectangle is viewed from a head-on position, i.e., at 0° to normal, the sides of the rectangle will be orthogonal. While viewing the rectangle at an oblique angle, e.g., at 45° to 60° from normal, the angle between the neighboring sides of the rectangle in image space will deviate from orthogonal. The deviation from orthogonal, angle α in FIG. 13, caused by a viewing angle of 45° to 60° from normal, is approximately 15° to 20°. Thus, a threshold for the deviation angle α, e.g., 15° to 20°, between neighboring sides in a rectangle may be used to eliminate false-positive rectangles. In other words, any rectangle with an angle between neighboring sides that is outside the range of 90°−α to 90°+α, is considered a false-positive rectangle. Other thresholds may be used if desired, and the threshold may vary if desired. For example, the threshold may be based on the size of the rectangle. Imposing a restriction on the angle between neighboring sides of the rectangle discards a significant number of false positive rectangles.

Additionally, if multiple rectangles are detected, a rectangle is selected based on the orientations of the detected rectangles (402), i.e., plane normal for each rectangle. Thus, the rectangle with the most consistent orientation from the set of detected rectangles is selected and the remainder is eliminated. For example, each detected rectangle may be assigned to one of a number of bins based on discrete orientation intervals. The rectangle from the bin with the largest number of rectangles and/or closest to the average orientation of the bin may be selected.

Figure 15:
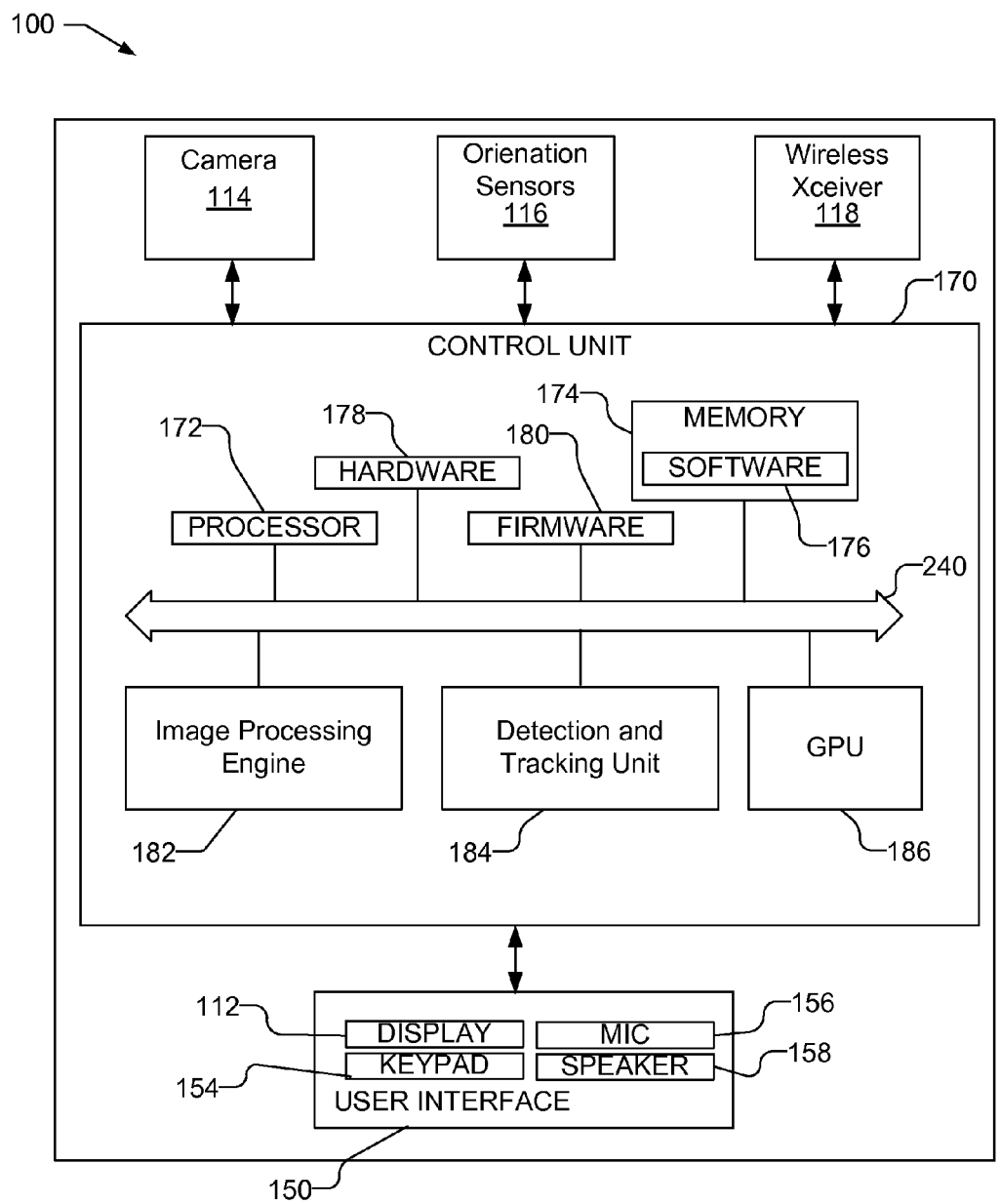
FIG. 15 illustrates a block diagram of a mobile platform capable generating a reference patch of an unknown environment on the fly.

FIG. 15 illustrates a block diagram of a mobile platform 100 capable generating a reference patch of an unknown environment on the fly, e.g., for positioning and tracking such as in AR type applications. The mobile platform 100 is illustrated as including a camera 114 for capturing an image of the environment, which may be either a photo or a frame of video. The mobile platform 100 may also include orientation sensors 116 which may be used to provide data with which the mobile platform 100 can determine its position and orientation, e.g., if the mobile platform 100 pans away from the detected object. Examples of orientation sensors that may be used with the mobile platform 100 include accelerometers, quartz sensors, gyros, or micro-electromechanical system (MEMS) sensors used as linear accelerometers, as well as magnetometers. The mobile platform 100 may further include a wireless transceiver 118, which may be used to provide a generated reference patch to other mobile platforms, either directly or through a wireless network 120 (FIG. 5), which may be a wireless wide area network (WWAN), a wireless local area network (WLAN), a wireless personal area network (WPAN), and so on, or through cellular telephonic access points.

The mobile platform 100 may also include a user interface 150 that includes the display 112 capable of displaying images, e.g., of the environment as well as rendered AR data if desired. The user interface 150 may also include a keypad 154 or other input device through which the user can input information into the mobile platform 100. If desired, the keypad 154 may be obviated by integrating a virtual keypad into the display 152 with a touch sensor. The user interface 150 may also include a microphone 156 and speaker 158, e.g., if the mobile platform is a cellular telephone. Of course, mobile platform 100 may include other elements unrelated to the present disclosure.

The mobile platform 100 also includes a control unit 170 that is connected to and communicates with the camera 114, orientation sensors 116, and wireless transceiver 118, as well as the user interface 150, along with any other desired features. The control unit 170 may be provided by a processor 172 and associated memory/storage 174, which may include software 176, as well as hardware 178, and firmware 180. The control unit 170 includes an image processing engine 182 for detecting the rectangular planar object in an image as well as warping the image to produce a reference patch. The control unit 170 may further include a vision based detection and tracking unit 184 that is used to determine the pose of the mobile platform 100 using the rectangular planar object in a reference patch which is compared to subsequently produced images of the rectangular planar object. The control unit 170 may further include a graphics processing unit (GPU) 186 for rendering AR data in response to the determined pose, which may then be displayed on display 112. The GPU 186 may also be used for general purpose programming techniques to accelerate the computer vision computational processing. The image processing engine, detection and tracking unit 184 and GPU 186 are illustrated separately and separate from processor 172 for clarity, but may be a combined and/or implemented in the processor 172 based on instructions in the software 176 which is run in the processor 172.

It will be understood as used herein that the processor 172, as well as one or more of the image processing engine 182, detection and tracking unit 184 and GPU 186 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 178, firmware 180, software 176, or any combination thereof. For a hardware implementation, the image processing engine, detection and tracking unit 184 and GPU 186 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 174 and executed by the processor 172. Memory may be implemented within or external to the processor 172.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing one image of a planar object with a mobile platform, the planar object comprising a first set of parallel lines that is perpendicular to a second set of parallel lines;
   detecting a plurality of sets of lines in the one image, each set of lines in the plurality sets of lines have a same direction in three dimensional space;
   identifying the first set of parallel lines that is perpendicular to the second set of parallel lines in the plurality of sets of lines using vanishing points to detect the planar object in the one image;
   defining a first axis for a world coordinate system using a first vanishing point for the first set of parallel lines and defining a second axis for the world coordinate system using a second vanishing point for the second set of parallel lines;
   recovering a camera rotation using the first axis and the second axis;
   generating a reference patch of at least a portion of the one image of the planar object using the camera rotation that is recovered; and
   comparing the reference patch to additional captured images of the planar object to estimate a pose of the mobile platform with respect to the planar object.

2. The method of claim 1, further comprising:
   performing an augmented reality application on the mobile platform using the pose of the mobile platform with respect to the planar object.

3. The method of claim 1, wherein identifying the first set of parallel lines and the second set of parallel lines to detect the planar object in the one image comprises:
   determining the first vanishing point for the first set of parallel lines and the second vanishing point for the second set of parallel lines; and
   using the first vanishing point and the second vanishing point to determine that the first set of parallel lines is perpendicular to the second set of parallel lines.

4. The method of claim 3, wherein
   detecting the plurality of sets of lines in the one image comprises identifying sets of lines that extend through a same vanishing point.

5. The method of claim 1, wherein the reference patch of at least the portion of the one image of the planar object comprises keypoint features bounded by the first set of parallel lines and the second set of parallel lines.

6. The method of claim 1, wherein the reference patch of at least the portion of the one image of the planar object comprises line features bounded by the first set of parallel lines and the second set of parallel lines.

7. The method of claim 6, wherein the line features bounded of the first set of parallel lines and the second set of parallel lines comprise a plurality of points on the first set of parallel lines and the second set of parallel lines including points of intersection between the first set of parallel lines and the second set of parallel lines.

8. The method of claim 1, wherein the reference patch of at least the portion of the one image of the planar object comprises features that are not bounded by the first set of parallel lines and the second set of parallel lines.

9. The method of claim 1, further comprising transmitting the reference patch to a second mobile platform.

10. An apparatus comprising:
a camera for capturing an image of a planar object, the planar object comprising a first set of parallel lines that is perpendicular to a second set of parallel lines;
a processor coupled to the camera for receiving the image of the planar object, the processor is adapted to detect a plurality of sets of lines in the image, each set of lines in the plurality sets of lines have a same direction in three dimensional space, identify the first set of parallel lines that is perpendicular to the second set of parallel lines in the plurality of sets of lines using vanishing points to detect the planar object in the image, define a first axis for a world coordinate system using a first vanishing point for the first set of parallel lines and defining a second axis for the world coordinate system using a second vanishing point for the second set of parallel lines, recover a camera rotation using the first axis and the second axis, generate a reference patch of at least a portion of the image of the planar object using the camera rotation that is recovered, and compare the reference patch to additional captured images of the planar object to estimate a pose with respect to the planar object.

11. The apparatus of claim 10, wherein the processor is further adapted to perform an augmented reality application using the pose with respect to the planar object.

12. The apparatus of claim 10, the processor is adapted to identify the first set of parallel lines and the second set of parallel lines to detect the planar object in the image by being adapted to determine the first vanishing point for the first set of parallel lines and the second vanishing point for the second set of parallel lines, and use the first vanishing point and the second vanishing point to determine that the first set of parallel lines is perpendicular to the second set of parallel lines.

13. The apparatus of claim 12, wherein the processor is adapted to detect the plurality of sets of lines in the image by being adapted to identify sets of lines that extend through a same vanishing point.

14. The apparatus of claim 10, wherein the processor is adapted to generate the reference patch of at least the portion of the image by being adapted to generate the reference patch with keypoint features bounded by the first set of parallel lines and the second set of parallel lines.

15. The apparatus of claim 10, wherein the processor is adapted to generate the reference patch of at least the portion of the image by being adapted to generate the reference patch with line features bounded by the first set of parallel lines and the second set of parallel lines.

16. The apparatus of claim 15, wherein the processor is adapted to generate the reference patch with the line features by being adapted to generate the line features with a plurality of points on the first set of parallel lines and the second set of parallel lines including points of intersection between the first set of parallel lines and the second set of parallel lines.

17. The apparatus of claim 10, wherein the processor is adapted to generate the reference patch of at least the portion of the image by being adapted to generate the reference patch with features not bounded by the first set of parallel lines and the second set of parallel lines.

18. The apparatus of claim 10, further comprising a wireless transceiver coupled to the processor, the processor being further adapted to transmit the reference patch to a different apparatus using the wireless transceiver.

19. An apparatus comprising:
means for capturing one image of a planar object, the planar object comprising a first set of parallel lines that is perpendicular to a second set of parallel lines;
means for detecting a plurality of sets of lines in the one image, each set of lines in the plurality sets of lines have a same direction in three dimensional space;
means for identifying the first set of parallel lines that is perpendicular to the second set of parallel lines in the plurality of sets of lines using vanishing points to detect the planar object in the one image;
means for defining a first axis for a world coordinate system using a first vanishing point for the first set of parallel lines and defining a second axis for the world coordinate system using a second vanishing point for the second set of parallel lines;
means for recovering a camera rotation using the first axis and the second axis;
means for generating a reference patch of at least a portion of the one image of the planar object using the camera rotation that is recovered; and
means for comparing the reference patch to additional captured images of the planar object to estimate a pose with respect to the planar object.

20. The apparatus of claim 19, further comprising:
means for performing an augmented reality application using the pose with respect to the planar object.

21. The apparatus of claim 19, wherein the means for identifying the first set of parallel lines that is perpendicular to the second set of parallel lines in the plurality of sets of lines using vanishing points to detect the planar object in the one image comprises:
means for determining the first vanishing point for the first set of parallel lines and the second vanishing point for the second set of parallel lines; and
means for using the first vanishing point and the second vanishing point to determine that the first set of parallel lines is perpendicular to the second set of parallel lines.

22. The apparatus of claim 19, further comprising means for transmitting the reference patch.

23. A non-transitory computer-readable medium including program code stored thereon, comprising:
program code to detect a plurality of sets of lines in an image, each set of lines in the plurality sets of lines have a same direction in three dimensional space;
program code to identify a first set of parallel lines that is perpendicular to a second set of parallel lines in the plurality of sets of lines using vanishing points to detect a planar object in the image, the planar object having the first set of parallel lines that is perpendicular to the second set of parallel lines;
program code to define a first axis for a world coordinate system using a first vanishing point for the first set of parallel lines and defining a second axis for the world coordinate system using a second vanishing point for the second set of parallel lines;

program code to recover a camera rotation using the first axis and the second axis;

program code to generate a reference patch of at least a portion of the image of the planar object using the camera rotation that is recovered, and program code to compare the reference patch to additional captured images of the planar object to estimate a pose with respect to the planar object.

24. The non-transitory computer-readable medium of claim 23, wherein the program code to identify the first set of parallel lines that is perpendicular to the second set of parallel lines in the plurality of sets of lines using vanishing points to detect the planar object in the image comprises:

program code to determine the first vanishing point for the first set of parallel lines and the second vanishing point for the second set of parallel lines program code to use the first vanishing point and the second vanishing point to determine that the first set of parallel lines is perpendicular to the second set of parallel lines.

* * * * *